(12) United States Patent
Rogers et al.

(10) Patent No.: US 6,385,367 B1
(45) Date of Patent: May 7, 2002

(54) PARALLEL DATA TRANSMISSION THROUGH SEGMENTED WAVEGUIDES OF LARGE DIAMETER

(75) Inventors: Robert Thomas Rogers; Alex Nalendra Persaud, both of Blacksburg, VA (US)

(73) Assignee: Northrop Grumman Corporation, Los Angeles, CA (US)

( * ) Notice: Subject to any disclaimer, the term of this patent is extended or adjusted under 35 U.S.C. 154(b) by 36 days.

(21) Appl. No.: 09/629,145

(22) Filed: Jul. 31, 2000

(51) Int. Cl.[7] .............................................. G02B 6/26
(52) U.S. Cl. ........................................... 385/26; 385/25
(58) Field of Search ....................................... 385/25, 26

(56) References Cited

U.S. PATENT DOCUMENTS

| | | | |
|---|---|---|---|
| 4,669,817 A | 6/1987 | Mori | 359/123 |
| 4,708,423 A | 11/1987 | Erman et al. | 385/14 |
| 5,239,230 A | 8/1993 | Mathews et al. | 313/571 |
| 5,259,056 A | 11/1993 | Davenport et al. | 385/115 |
| 5,305,401 A | 4/1994 | Becker et al. | 385/24 |
| 5,341,445 A | 8/1994 | Davenport et al. | 385/39 |
| 5,420,946 A * | 5/1995 | Tsai | 385/22 |
| 5,479,545 A | 12/1995 | Davenport et al. | 385/43 |
| 5,604,837 A | 2/1997 | Tanaka | 385/147 |
| 5,774,608 A | 6/1998 | Allen et al. | 385/39 |
| 5,812,713 A | 9/1998 | Allen et al. | 385/39 |
| 5,920,667 A * | 7/1999 | Tiao et al. | 385/22 |

* cited by examiner

*Primary Examiner*—Cassandra Spyrou
*Assistant Examiner*—Alessandro V. Amari
(74) *Attorney, Agent, or Firm*—Lowe Hauptman Gilman & Berner, LLP

(57) ABSTRACT

The present invention is directed to a fiber optic rotary joint comprised of multiple segmented waveguides. Each of the multiple segmented waveguides is located on the stator. The segmented waveguides are circumferentially spaced from each other. Spaces between the segmented waveguides are non-reflective. Each of the segmented waveguides has an optical pickup. There are a plurality of optical transmitters located on the rotor. In the preferred embodiment there are sixteen transmitters with eight transmitters transmitting at one time and eight transmitters turned off at that time.

21 Claims, 3 Drawing Sheets

PARALLEL DATA TRANSMISSION THROUGH SEGMENTED WAVEGUIDES OF LARGE DIAMETER

RELATED APPLICATIONS

The present application is related to a patent application entitled "Segmented Waveguide for Large Diameter Fiber Optic Rotary Joint", filed on even date herewith, and is related to U.S. patent application Ser. No. 09/531,772, filed Mar. 21, 2000, entitled "Multi-Channel On-Axis Fiber Optic Rotary Joint", and assigned to the instant assignee. Both of these patent applications are hereby incorporated by reference into this specification in their entirety. The present application also relates to U.S. Pat. No. 5,991,478, issued Nov. 23, 1999 entitled "Fiber Optic Rotary Joint", and U.S. patent application Ser. No. 09/115,946, filed Jul. 15, 1998 entitled "Fiber Optic Rotary Joint", both of which are assigned to the instant assignee and are hereby incorporated by reference into the specification in their entirety.

FIELD OF THE INVENTION

The present invention relates generally to fiber optic rotary joints, and more particularly, to a fiber optic rotary joint that can receive multiple different signals during rotation of the rotor. Even more particularly, the present application relates to parallel data transmission through segmented waveguides of large diameter.

BACKGROUND OF THE INVENTION

The patent application entitled "Sectional Waveguides for Large Diameter Fiber Optic Rotary Joint" describes an example of a fiber optic rotary joint having eight source fibers (of equal length, 45° spacing), two sectional waveguides (22.5° in length, 55° spacing) and two pickup fibers (of equal length, positioned at ends of a respective waveguide). The same modulated light source is applied to each of the eight source fibers and is received by the two pickup fibers, and recovered through summation of the light output from the two pickup fibers. The described configuration minimizes the difference in propagation delay between the signals, which reduces pulse distortion and jitter when the optical signals are summed. The reduction in pulse distortion and jitter allows for higher data rates to be transmitted through the fiber optic rotary joint than is possible with a continuous waveguide. Referring now to FIG. 1, sufficient optical power necessary must be maintained to achieve a specified bit error rate (BER) with the arrangement illustrated in FIG. 1. For example, the same BER performance as disclosed in the patent application entitled "Sectional Waveguides for Large Diameter Fiber Optic Rotary Joint" can be achieved with a single short section of waveguide with one pickup fiber (RX 0). However, a single short section of waveguide with one pickup fiber (RX 0) will require 16 sources (TX A, TX B ... TX P) to maintain the optical power level for a specified BER. As depicted in FIG. 1, only 22.5° of the 360° ring is actively being used for signal transmission.

Thus, a need exists in the art for a segmented waveguide that utilizes a large portion of the ring for signal transmission. Another need exists for a segmented waveguide which can handle multiple individual data streams.

SUMMARY OF THE INVENTION

It is, therefore, an object of the present invention to utilize a large portion of the ring diameter for signal transmission.

It is another object of the present invention to increase the data rate that can be transmitted through the fiber optic rotary joint.

Yet a further object of the present invention is to transmit up to eight separate channels of information across a fiber optic rotary joint.

Still a further object of the present invention is to transmit eight individual data streams or an eight byte parallel data stream through the fiber optic rotary joint.

The present invention is directed to a fiber optic rotary joint comprised of multiple segmented waveguides. Each of the multiple segmented waveguides is located on the stator. The segmented waveguides are circumferentially spaced from each other. Spaces between the segmented waveguides are non-reflective. Each of the segmented waveguides has an optical pickup. There are a plurality of optical transmitters located on the rotor. In the preferred embodiment there are sixteen transmitters with eight transmitters transmitting at one time and eight transmitters turned off at that time. Although the present invention is typically used in conjunction with a cat scan machine, the present invention is also usable with any other device that requires a rotary joint.

Rather than transmitting a single serial data stream through the large fiber optic rotary joint 100 which is limited to the maximum data rate of the sectional waveguide 110–180, the present invention transmits eight individual serial data streams or an eight bit parallel word data stream through the large fiber optic rotary joint 100. By using an encoder or resolver, the position of each source fiber relative to the eight waveguides can be determined to a very high degree of accuracy. The information generated by the encoder or resolver will feed a high speed-switching network. The eight individual channels of data or one eight-bit parallel channel are fed into the switcher. The switcher is used to route the input data to the appropriate source fiber such that continuity is maintained between a specific input channel and a specific waveguide/pickup fiber receiver.

These and other objects of the present invention are achieved by providing a fiber optic rotary joint including a first plurality of optical waveguide segments attachable to a stator. Each of the optical waveguide segments has an optical pickup. A second plurality of optical transmitters is located on a rotor and rotatable therewith. A position determining device determines a circumferential location of at least one of the plurality of optical transmitters during rotation thereof. A switch routes optical signals to be transmitted by the second plurality of optical transmitters to be received by a predetermined one of the optical pickups.

The foregoing and other objects of the present invention are achieved by providing a method of transmitting multiple optical signals through a fiber optic rotary joint having a first plurality of segmented waveguide segments on a stator. Each of the segmented waveguide segments has an associated optical receiver and a second plurality of optical transmitters on a rotor. A position is determined for each of the second plurality of optical transmitters during rotation of the rotor. Based upon the position of the plurality of optical transmitters, each of the multiple optical signals is routed to a predetermined one of the segmented waveguides.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

BEST MODE FOR CARRYING OUT THE INVENTION

Figure 2:
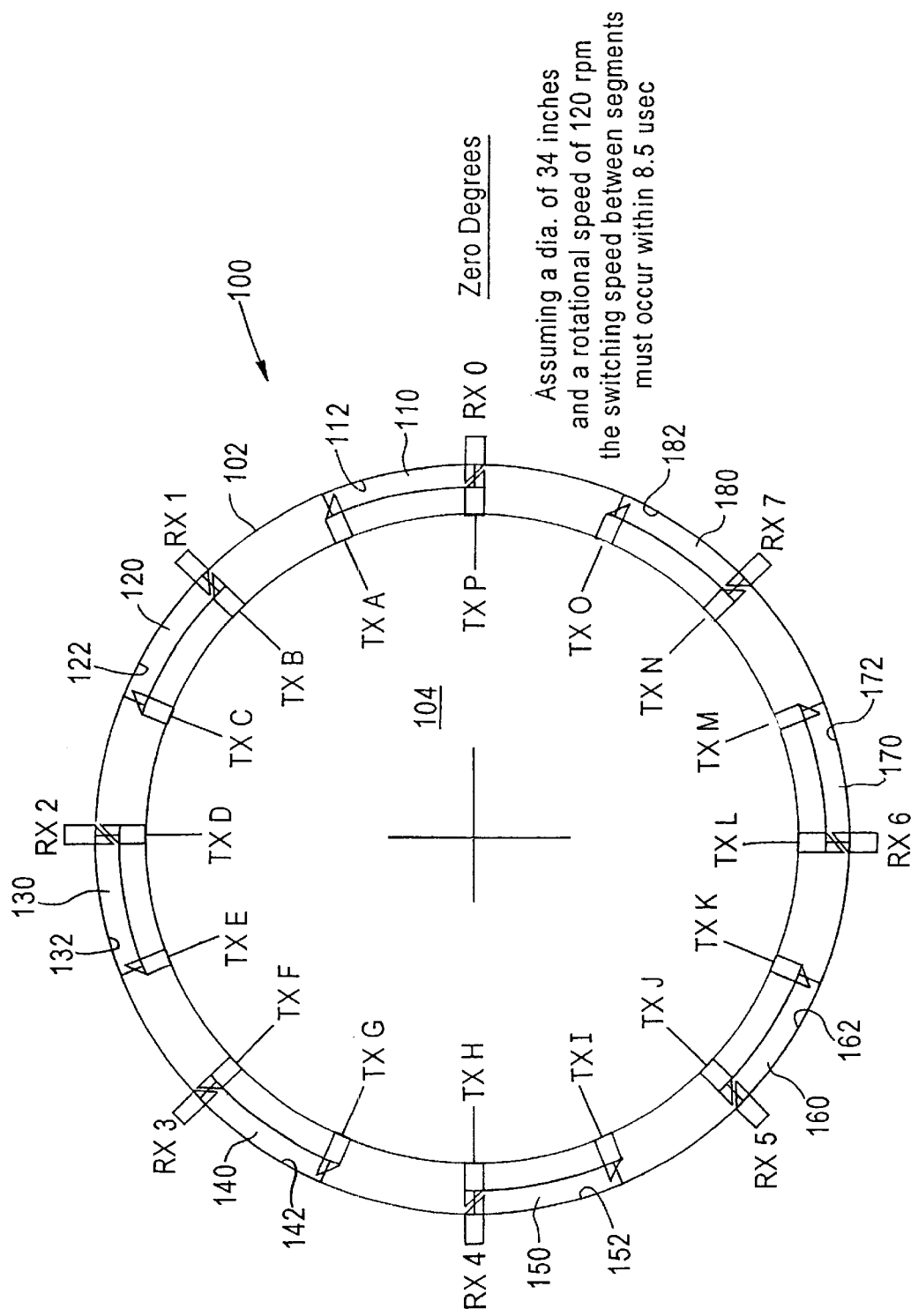
FIG. 2 is a schematic illustration of a first plurality of segmented waveguides positioned on a stator and a second plurality of optical transmitters positioned on the rotor according to the present invention.

Refer now to FIG. 2 in which a fiber optic rotary joint 100 according to the present invention is depicted. The fiber optic rotary joint includes a stator 102 and a rotor 104. The fiber optic rotary joint 100 includes eight receivers RX 0, RX 1 . . . RX 7, each on a segmented waveguide assembly 110, 120, 130 . . . 180, each of which has a corresponding annular reflective surface 112, 122, 132 . . . 182, respectively. Each of the segmented waveguide assemblies 110–180 is of short choral length and extends for approximately 22.5° and has the receiver RX 0, RX 1 . . . RX 7, respectively, positioned at one end thereof. Each of the segmented waveguide assemblies 110 is attached to the stator 102. As depicted in FIG. 2, each of the receivers RX 0, RX 1 . . . RX 7 is located at the most counterclockwise position for each of the segmented waveguide assemblies 110–180. Each of the segmented waveguides 110–180 is equally circumferentially spaced and there is a gap or area of the existing gantry that is not actively being used for signal transmission. The inactive areas are non-reflective and absorb the transmitted optical signals. For example, there are gaps between segmented waveguide assemblies 110 and 120; between 120 and 130; between 130 and 140; between 140 and 150; between 150 and 160; between 160 and 170; between 170 and 180; and between 180 and 110.

As depicted in FIG. 2, there are sixteen transmitters TX A, TX B, TX C . . . TX P which are equally circumferentially spaced on the periphery of the rotor 104.

In the position, as depicted in FIG. 2, receiver RX 0 will receive an optical signal from transmitter TX A, and receiver RX 1 will receive an optical signal from transmitter TX C.

As the rotor 104 to which the transmitters are connected rotates in a clockwise direction as depicted in FIG. 2, for example, an angle 22.5° from the position in FIG. 2, transmitter TX B will be transmitting a signal received by receiver RX 0 and transmitter TX D will be receiving a signal received by receiver RX 1.

Figure 1:
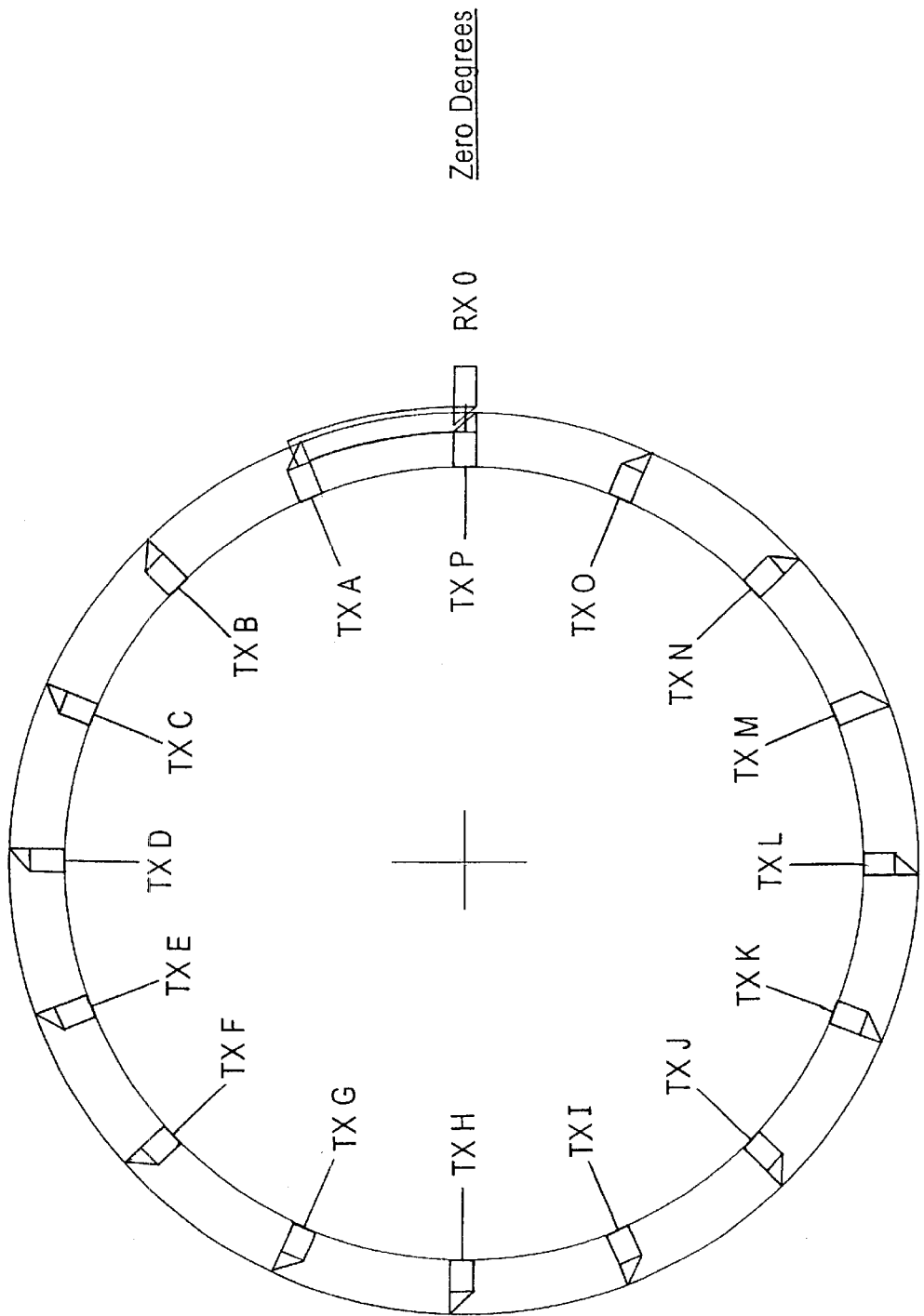
FIG. 1 is a schematic illustration of a segmented waveguide positioned on a stator and sixteen optical transmitters positioned on a rotor.

The present invention can advantageously utilize the inactive-areas of the ring (depicted in FIG. 1) by using additional sections of waveguide 110–180 with their corresponding pickup fibers RX 0, RX 1 . . . RX 7. In FIG. 2, there are eight sectional waveguides 110–180 (22.5° in length, 22.5° spacing), 16 source fibers TX 0, TX 1 . . . TX P (of equal length, 22.5° spacing), and eight pickup fibers RX 0, RX 1 . . . RX 7 (of equal length, positioned at ends of waveguide). At this time, each of the sixteen source fibers RX 0-TX P can transmit the same modulated light source, meaning all eight pickup fibers RX 0–RX 7 receive the same signal from the same modulated light source. This feature would allow for certain combinations of redundancy in the system and would reduce the amount of optical power required for a particular BER. The received signal could be summed from all of the received signals.

However, the desire is to increase the data rate of the large diameter fiber optic rotary joint 100. The present invention treats each waveguide 112–182 and pickup fiber assembly 110–180 as an individual receiver. Rather than transmitting a single serial data stream through the large fiber optic rotary joint 100 which is limited to the maximum data rate of the sectional waveguide 110–180, the present invention transmits eight individual serial data streams or an eight bit parallel word data stream through the large fiber optic rotary joint 100. By using an encoder or resolver (FIG. 3), the position of each source fiber TX 0–TX P relative to the eight waveguides 110–180 can be determined to a very high degree of accuracy. The encoder or resolver signal can be generated be an existing encoder or resolver which is part of the drive mechanism for rotating the rotor in a cat scan machine. If the present invention is used in a device that does not already have an encoder or resolver then one will be provided. The information generated by the encoder or resolver 204 will feed a high speed-switching network 202 ("switcher"). The eight individual channels of data or one eight-bit parallel channel are fed into the switcher 202. The eight individual channels or one eight-bit parallel channel are described in conjunction with a 40 inch diameter ring. Of course, it should be appreciated that other numbers of channels or bits may be used depending upon various considerations including ring diameter, data rate, etc. The switcher 202 is used to route the input data to the appropriate source fiber TX 0–TX P such that continuity is maintained between a specific input channel and a specific waveguide/pickup fiber receiver RX 0–RX 7. Table 1 below shows the degree location, in this example, for turning the transmitter on and off with respect to the input data.

|  | TXA | TXB | TXC | TXD | TXE | TXF | TXG | TSH | THI | TXJ | TXK | TXL |
|---|---|---|---|---|---|---|---|---|---|---|---|---|
| BIT0 ON | 355 | 332.5 | 310 | 287.5 | 265 | 242.5 | 220 | 197.5 | 175 | 152.5 | 130 | 107.5 |
| BIT0 OFF | 22.5 | 0 | 337.5 | 315 | 292.5 | 270 | 247.5 | 225 | 202.5 | 180 | 157.5 | 135 |
| BIT 1 ON | 40 | 17.5 | 355 | 332.5 | 310 | 287.5 | 265 | 242.5 | 220 | 197.5 | 175 | 152.5 |

-continued

|  | TXA | TXB | TXC | TXD | TXE | TXF | TXG | TSH | THI | TXJ | TXK | TXL |
|---|---|---|---|---|---|---|---|---|---|---|---|---|
| BIT 1 OFF | 67.5 | 45 | 22.5 | 0 | 337.5 | 315 | 292.5 | 270 | 247.5 | 225 | 202.5 | 180 |
| BIT 2 ON | 85 | 62.5 | 40 | 17.5 | 355 | 332.5 | 310 | 287.5 | 265 | 242.5 | 220 | 197.5 |
| BIT 2 OFF | 112.5 | 90 | 67.5 | 45 | 22.5 | 0 | 337.5 | 315 | 292.5 | 270 | 247.5 | 225 |
| BIT 3 ON | 130 | 107.5 | 85 | 62.5 | 40 | 17.5 | 355 | 332.5 | 310 | 287.5 | 265 | 242.5 |
| BIT 3 OFF | 157.5 | 135 | 112.5 | 90 | 67.5 | 45 | 22.5 | 0 | 337.5 | 315 | 292.5 | 270 |
| BIT 4 ON | 175 | 152.5 | 130 | 107.5 | 85 | 62.5 | 40 | 17.5 | 355 | 332.5 | 310 | 287.5 |
| BIT 4 OFF | 202.5 | 180 | 157.5 | 135 | 112.5 | 90 | 67.5 | 45 | 22.5 | 0 | 337.5 | 315 |
| BIT 5 ON | 220 | 197.5 | 175 | 152.5 | 130 | 107.5 | 85 | 62.5 | 40 | 17.5 | 355 | 332.5 |
| BIT 5 OFF | 247.5 | 225 | 202.5 | 180 | 157.5 | 135 | 112.5 | 90 | 67.5 | 45 | 22.5 | 0 |
| BIT 6 ON | 265 | 242.5 | 220 | 197.5 | 175 | 152.5 | 130 | 107.5 | 85 | 62.5 | 40 | 17.5 |
| BIT 6 OFF | 202.5 | 270 | 247.5 | 225 | 202.5 | 180 | 157.5 | 135 | 112.5 | 90 | 67.5 | 45 |
| BIT 7 ON | 310 | 287.5 | 265 | 242.5 | 220 | 197.5 | 175 | 152.5 | 130 | 107.5 | 85 | 62.5 |
| BIT 7 OFF | 337.5 | 315 | 292.5 | 270 | 247.5 | 225 | 202.5 | 180 | 157.5 | 135 | 112.5 | 90 |

Figure 3:
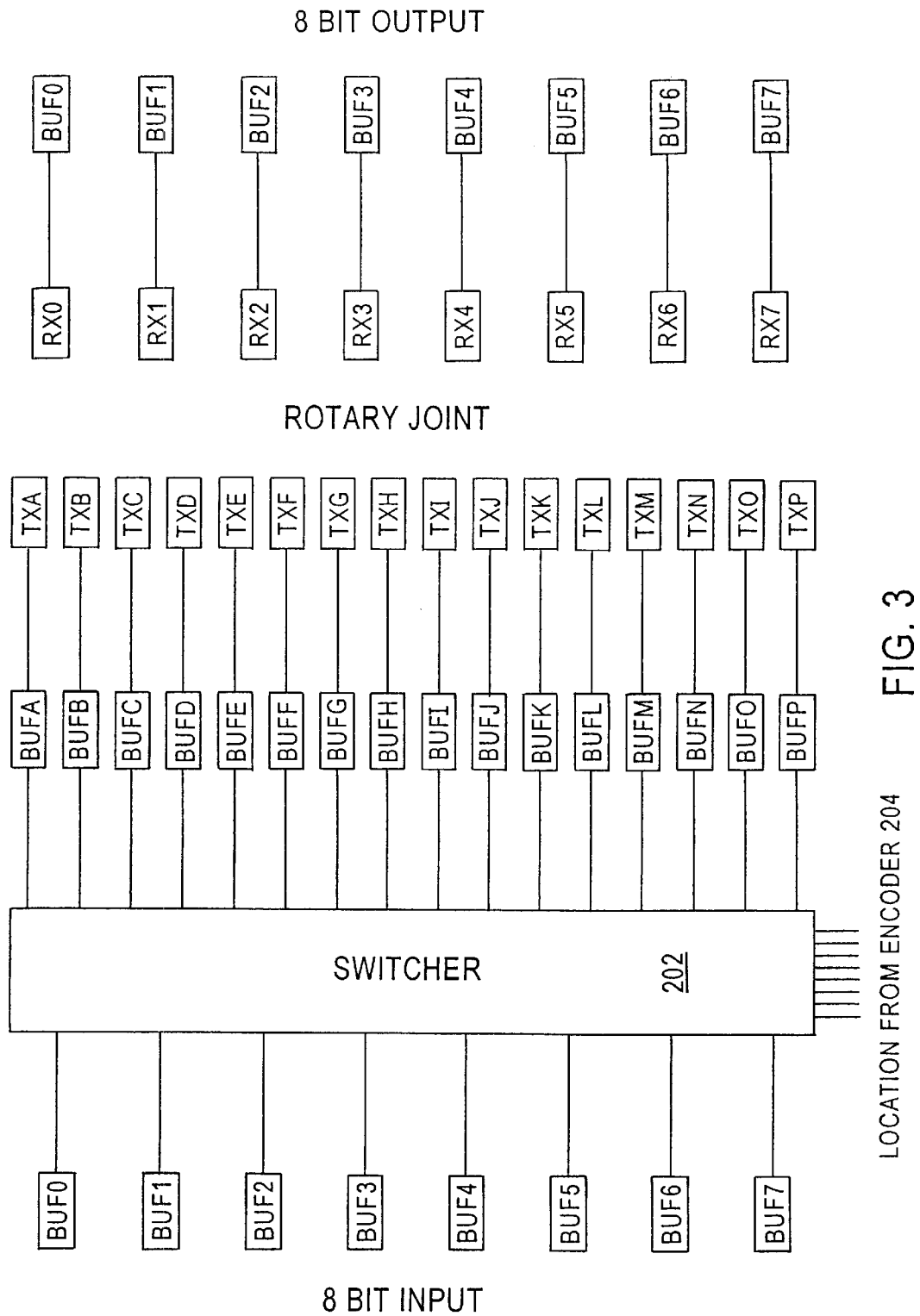
FIG. 3 is a diagram depicting a switcher, encoder and input and output buffers used in the fiber optic rotary joint according to the present invention.

This concept is presented in more detail in FIG. 3. The eight-bit input is connected to the input buffer BUF[0 . . . 7]. The contents of the input buffer BUF [0 . . . 7] are connected to the switcher 202 whose control signals are generated by the information from the resolver/encoder 204. In a stationary position, as shown in FIG. 2, the switcher 202 routes the contents of:

BUF[0] to TX A
BUF[1] to TX C
BUF[2] to TX E
BUF[3] to TX G
BUF[4] to TX I
BUF[5] to TX K
BUF[6] to TX M
BUF[7] to TX 0 and turns off TX B, D, F, H, J, L, N, P. This maps BUF[0 . . . 7] to RX[0 . . . 7] through the switching network including BUF A–BUF P and source fibers TX A–TX P. RX[0 . . . 7] are connected to the output buffer, BUF[0 . . 7]. As can be readily appreciated, assuming a diameter of 34 inches and a rotational speed of 120 rpm the switching speed between waveguides must occur within 8.5 $\mu$sec. In the next position 8.5 $\mu$sec, later the switches 202 routes the contents of:

BUF[0] to TX B
BUF[1] to TX D
BUF[2] to TX F
BUF[3] to TX H
BUF[4] to TX J
BUF[5] to TX L
BUF[6] to TX N
BUF[7] to TX P and turns off TX A, C, E, G, I, K, M, O. Each sectional waveguide assembly 110–180 can support a data rate up to 500 Mbps. With eight independent sectional waveguides with eight byte word or byte the data throughput could reach 4 Gbps. If wave division multiplexing is used then 16 bit words can be transmitted for a maximum throughput of 8 Gbps. If counter rotating optical signals are used, then 16 bit words could be transmitted for a maximum throughput of 8 Gbps. If wave division multiplexing and counter rotating signals are used, then 32 bit words could be transmitted for a maximum throughput of 16 Gbps.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A fiber optic rotary joint, comprising: a first plurality of optical waveguide segments attachable to a stator, each of said optical waveguide segments has an optical pickup; a second plurality of optical transmitters is each located on a rotor and rotatable therewith; a position determining device for determining a circumferential location of at least one of said plurality of optical transmitters during rotation thereof; a switch for routing each optical signal transmitted from said second plurality of optical transmitters to be received by respective ones of said optical pickups.

2. The fiber optic rotary joint of claim 1, wherein said position determining device is one of an encoder and a resolver.

3. The fiber optic rotary joint of claim 1, wherein said first plurality of optical waveguides comprises eight, and each of said first plurality of waveguides extends approximately 22.5° and is spaced approximately 22.5° from each of the adjacent waveguides.

4. The fiber optic rotary joint of claim 1, wherein each of said waveguide segments receives an optical signal having a data rate of 500 Mbps.

5. The fiber optic rotary joint of claim 1, wherein a total data rate of the fiber optic rotary joint is 4 Gbps.

6. The fiber optic rotary joint of claim 1, wherein said second plurality of optical transmitters comprises sixteen transmitters.

7. The fiber optic rotary joint of claim 1, wherein said second plurality of optical transmitters is twice the number of said first plurality of optical receivers.

8. The fiber optic rotary joint of claim 1, wherein eight serial data streams are transmitted through the fiber optic rotary joint.

9. The fiber optic rotary joint of claim 1, wherein a parallel data stream is transmitted through the fiber optic rotary joint.

10. The fiber optic rotary joint of claim 1, further comprising an input buffer connected to each of said plurality of optical transmitters.

11. The fiber optic rotary joint of claim 1, further comprising a wave division multiplexer for providing sixteen bit optical signals to each of the optical transmitters.

12. The fiber optic rotary joint of claim 11, wherein each of said optical pickups receives a data rate of 2 Mbps.

13. A method of transmitting multiple optical signals through a fiber optic rotary joint having a first plurality of segmented waveguide segments on a stator, with each of the segmented waveguide segments having an associated optical receiver and a second plurality of optical transmitters on a rotor, comprising:

determining a position for each of the second plurality of optical transmitters during rotation of the rotor;

routing based upon the position of the plurality of optical transmitters, each of the multiple optical signals to a predetermined one of the segmented waveguides.

14. The method of claim 13, comprising switching some of the second plurality of optical transmitters on the other of the second plurality of optical transmitters off.

15. The method of claim 13, wherein the multiple optical signals is one of a serial data stream and a parallel data stream.

16. The method of claim 13, comprising buffering the optical signal before transmission.

17. The method of claim 14, wherein alternate ones of the second plurality of optical transmitters are switched on.

18. The method of claim 13, further comprising receiving the multiple optical signals at each of the predetermined optical receiver.

19. The method of claim 18, comprising reflecting optical signals off the segmented waveguide into an optical receiver.

20. The method of claim 13, comprising absorbing reflected optical signals non-reflective segments between segmented waveguides.

21. The fiber optic rotary joint of claim 1, wherein said switch routes optical signals during rotation of said rotor.

* * * * *

UNITED STATES PATENT AND TRADEMARK OFFICE
CERTIFICATE OF CORRECTION

PATENT NO.  : 6,385,367 B1
DATED       : May 7, 2002
INVENTOR(S) : Robert Thomas Rogers and Alex Nalendra Persaud It is certified that error appears in the above-identified patent and that said Letters Patent is hereby corrected as shown below:

<u>Title page,</u>
Item [73], Assignee, please replace "Northrop Grumman Corporation, Los Angeles, CA, (US)" with -- Litton Systems, Inc., Woodland Hills, California, (US) --.

Signed and Sealed this

Twenty-ninth Day of July, 2003

JAMES E. ROGAN
*Director of the United States Patent and Trademark Office*